US012378799B2

(12) United States Patent
Chen

(10) Patent No.: US 12,378,799 B2
(45) Date of Patent: Aug. 5, 2025

(54) ELECTRONICALLY LINKED CABINET LOCK

(71) Applicant: MARTAS PRECISION SLIDE CO., LTD., New Taipei (TW)

(72) Inventor: Wan-Lai Chen, New Taipei (TW)

(73) Assignee: MARTAS PRECISION SLIDE CO., LTD., New Taipei (TW)

( * ) Notice: Subject to any disclaimer, the term of this patent is extended or adjusted under 35 U.S.C. 154(b) by 148 days.

(21) Appl. No.: 18/230,674

(22) Filed: Aug. 7, 2023

(65) Prior Publication Data

US 2025/0052094 A1 Feb. 13, 2025

(51) Int. Cl.
*E05B 65/466* (2017.01)
*E05B 47/00* (2006.01)

(52) U.S. Cl.
CPC ........ *E05B 65/466* (2013.01); *E05B 47/0001* (2013.01); *E05B 2047/0016* (2013.01); *E05B 2047/0025* (2013.01); *E05B 2047/0054* (2013.01); *E05B 2047/0056* (2013.01)

(58) Field of Classification Search
CPC ...... E05B 65/46; E05B 65/462; E05B 65/463; E05B 65/464; E05B 65/466
See application file for complete search history.

(56) References Cited

U.S. PATENT DOCUMENTS 1,574,712 A * 2/1926 Stone .................... E05B 65/462 312/219
2,966,384 A * 12/1960 Bergman .............. E05B 65/462 312/218
4,168,103 A * 9/1979 Hagen ................... E05B 65/462 312/219
4,579,376 A * 4/1986 Charlton ............... E05B 47/026 292/144
5,176,436 A * 1/1993 Mitchell ............... E05B 65/466 312/217
5,709,442 A * 1/1998 Feldpausch ........... E05B 65/462 312/221
5,805,074 A * 9/1998 Warren ................. E05B 65/462 312/215

(Continued)

FOREIGN PATENT DOCUMENTS

TW M244802 10/2004
TW M245274 10/2004

(Continued)

*Primary Examiner* — Alyson M Merlino
(74) *Attorney, Agent, or Firm* — Fei-Hung Yang

(57) ABSTRACT

An electronically linked cabinet lock includes an electronic device and a locking module. The electronic device includes a sensing element installed onto a surface of the cabinet, and a main body, located in an interior of the cabinet, connected to the sensing element via a signal, and having a movable telescopic rod. The locking module is installed within a telescopic range of the movable telescopic rod and includes a fixed seat, a first slider and a second slider, and the first slider and the second slider are movably installed in the fixed seat, and an end of the movable telescopic rod is connected to the first slider to synchronously link the second slider to move vertically. By triggering the sensing element to generate a drive signal, all slide rails used by the drawers are locked/unlocked synchronously, so as to broaden the scope of applicability and enhance the practicality.

5 Claims, 6 Drawing Sheets

(56) References Cited

U.S. PATENT DOCUMENTS

| | | | | | |
|---|---|---|---|---|---|
| 6,116,067 | A * | 9/2000 | Myers | E05B 65/462 | 70/279.1 |
| 6,746,091 | B2 * | 6/2004 | Friar | E05B 65/462 | 312/218 |
| 7,393,067 | B2 * | 7/2008 | Huang | E05B 65/462 | 312/219 |
| 7,850,259 | B2 * | 12/2010 | Chen | E05B 65/466 | 312/221 |
| 7,891,222 | B2 * | 2/2011 | Ratkus | E05B 65/462 | 70/279.1 |
| 7,946,663 | B2 * | 5/2011 | Holcomb | E05B 65/46 | 312/217 |
| 10,966,520 | B2 * | 4/2021 | Chen | E05B 65/462 | |
| 11,089,872 | B1 * | 8/2021 | Chen | E05B 65/464 | |
| 11,367,321 | B2 * | 6/2022 | Tartal | E05B 65/025 | |
| 2007/0050051 | A1 * | 3/2007 | Chang | E05B 65/462 | 700/17 |
| 2012/0068590 | A1 * | 3/2012 | Chen | E05B 65/464 | 312/333 |
| 2019/0069673 | A1 * | 3/2019 | Nelson | E05B 65/466 | |

FOREIGN PATENT DOCUMENTS

| | | |
|---|---|---|
| TW | M284291 | 1/2006 |
| TW | M333109 | 6/2008 |
| TW | I428102 | 3/2014 |
| TW | I455700 | 10/2014 |

* cited by examiner

ELECTRONICALLY LINKED CABINET LOCK

BACKGROUND

Technical Field

The present disclosure relates to the field of a lock for cabinets, and more particularly relates to an electronically linked cabinet lock having an electronic device and a locking module, in which the locking module is designed for different types of interlocking devices, thus it can be used universally in various kinds of interlocking devices available on the market, and can be set up for use quickly to carry out the operation of locking or unlocking slide rails, so as to allow the original interlocking device to have an electronically linked function.

Description of Related Art

In general, cabinets are usually provided with a slide rail to assist and facilitate sliding and pulling a drawer, and the slide rail is designed for the purpose of carrying an object to slide linearly, and the structure of the slide rail generally includes a fixed rail, at least one sliding rail and at least one sliding part, so that after the slide rail is installed in the cabinet, the sliding rail can move the drawer relative to the fixed rail fixed inside the cabinet by means of the sliding part and enhance the smoothness of use. Although the slide rail enhances the smoothness of use, it often causes the drawer to slide out on its own or a multiple of drawers to open at the same time, causing the center of gravity of the cabinet to be skewed, and resulting in potential hazards such as crushing or pinching.

In order to prevent danger, slide mechanisms with an interlocking effect are introduced for the main purpose of preventing the opening and limiting the position of unused drawers. Examples of these slide mechanisms have been disclosed in R.O.C. Pat. No. M333109 entitled “Front interlocking structure for drawer slide rail”, R.O.C. Pat. No. M244802 entitled “Drawer interlocking device”, R.O.C. Pat. No. M245274 entitled “Improved drawer interlocking device”, R.O.C. Pat. No. M284291 entitled “Drawer interlocking and braking device”, R.O.C. Pat. No. 1455700 entitled “Drawer slide rail linking and interlocking device” and R.O.C. Pat. No. 1428102 entitled “Linking and interlocking structure for drawer slide rails, which have respectively disclosed various types of interlocking structures or interlocking devices used for linkage and interlock. Their principle is that each slide rail is equipped with the interlocking structure or interlocking device, and after the slide rail is pulled out, the interlocking structure or interlocking device is linked to prop open an interlocking slider inside the interlocking structure or interlocking device, and each interlocking structure or interlocking device is connected through a linkage part (such as a cable or a linkage rod), so that after the interlocking slider is propped open, the linkage parts are driven to synchronously drive the other interlocking structures or interlocking devices to be locked, so as to lock other unused drawer, and achieve the effects of preventing the opening and limiting the position of the unused drawers.

In view of the needs above, the creator of this disclosure hopes to further enhance the function of the original cabinet by means of the design of the interlocking structure of this disclosure and design an electronically-linked cabinet lock. Through conventional electronic sensing and recognition technologies combined with the interlocking device that can be used universally in various types of interlocking devices or the locking module that can be directly used in general slide rails, the electronically linked cabinet lock can be quickly set up for use to carry out the operation of locking or unlocking the slide rails, so as to enable the original interlocking device to have the electronically-linked function and to significantly improve the convenience of the use of the locking device.

SUMMARY

Therefore, it is a primary objective of the present disclosure to provide an electronically linked cabinet lock with an electronic device and a locking module, the electronic device includes a sensing element installed on a surface of the cabinet surface and a movable telescopic rod, the locking module is installed within a telescopic range of the movable telescopic rod, the interior of the locking module is provided with a first slider and a second slider, an end of the movable telescopic rod is connected to the first slider to synchronously link with the second slider and move the second slider vertically, and the sensing element can be trigger to synchronously complete the operation of locking or unlocking all slide rails used by the drawers at the same time. The locking module of this disclosure can be applied to all kinds of interlocking devices or interlocking modules available on the market, and an electronic sensing effect is added to enhance its practicality.

To achieve the aforementioned and other objectives, this disclosure discloses an electronically linked cabinet lock, installed on a cabinet, and connected to a plurality of slide rails for the use of all drawers of the cabinet, to provide a complete locking or unlocking function, and the electronically linked cabinet lock comprises: an electronic device, including a sensing element installed on a surface of the cabinet, a main body, located in an interior of the cabinet, connected to the sensing element via a signal, and a movable telescopic rod installed in the main body, and the locking module includes a fixed seat, a first slider and a second slider, the first slider and the second slider are movably installed in the fixed seat, the moving paths of the first slider and the second slider are configured to be perpendicular to each other, an end of the movable telescopic rod is connected to the first slider, and when the first slider is pushed to move reciprocally, it synchronously links the second slider to move reciprocally in a vertical direction; such that after the locking module is connected to one or more slide rails used by the drawers, a drive signal is generated by triggering the sensing element, so as to drive the movable telescopic rod to extend or retract, and simultaneously perform locking or unlocking actions through the one or more slide rails.

In an embodiment of this disclosure, the electronic device includes the sensing element, the main body, a circuit board and a driver power supply, the sensing element and the main body are electrically connected to the circuit board, the circuit board is electrically connected to the driver power supply, the circuit board is provided with a recognition module for receiving and recognizing a signal of the sensing element, and generating the drive signal after recognition, and the recognition module the recognition module uses a recognition technology selected from the group consisting of fingerprint recognition, RFID recognition and iris recognition. In addition, the fixed seat is provided with has a first slide installed in the fixed seat and configured to be corresponsive to the first slider, the second slider is provided with a second slide, the first slide and the second slide are configured to be perpendicular to each other, the interior of the first slider is provided with a limit ditch, and the second slider is provided with a positioning post which is movably installed in the limit ditch, so that the second slider is linked by the first slider to move reciprocally in a limited manner along the extension direction of the second slide.

In another embodiment of this disclosure, the electronically linked cabinet lock further includes a cable type interlocking mechanism, which includes a plurality of locks and a plurality of cables, each lock is installed at an end of each slide rail and provided with a locking or unlocking function, the slide rails are connected to each other by the cables, and one of the slide rails that is close to the second slider is connected with the second slider via one of the cables; or the electronically linked cabinet lock of this disclosure further includes a linkage rod type interlocking mechanism which includes a plurality of locks and a plurality of connecting rods, each lock is installed at an end of each slide rail and provided with a locking or unlocking function, the slide rails are connected to each other by the connecting rods, and one of the slide rails that is close to the second slider is connected with the second slider via one of the connecting rods; or the electronically linked cabinet lock of this disclosure further includes a trigger type interlocking mechanism which includes a plurality of locks installed at an end of each slide rail and provided with a locking or unlocking function, each lock is provided with a trigger part connected to the second slider.

DESCRIPTION OF THE EMBODIMENTS

Figure 1:
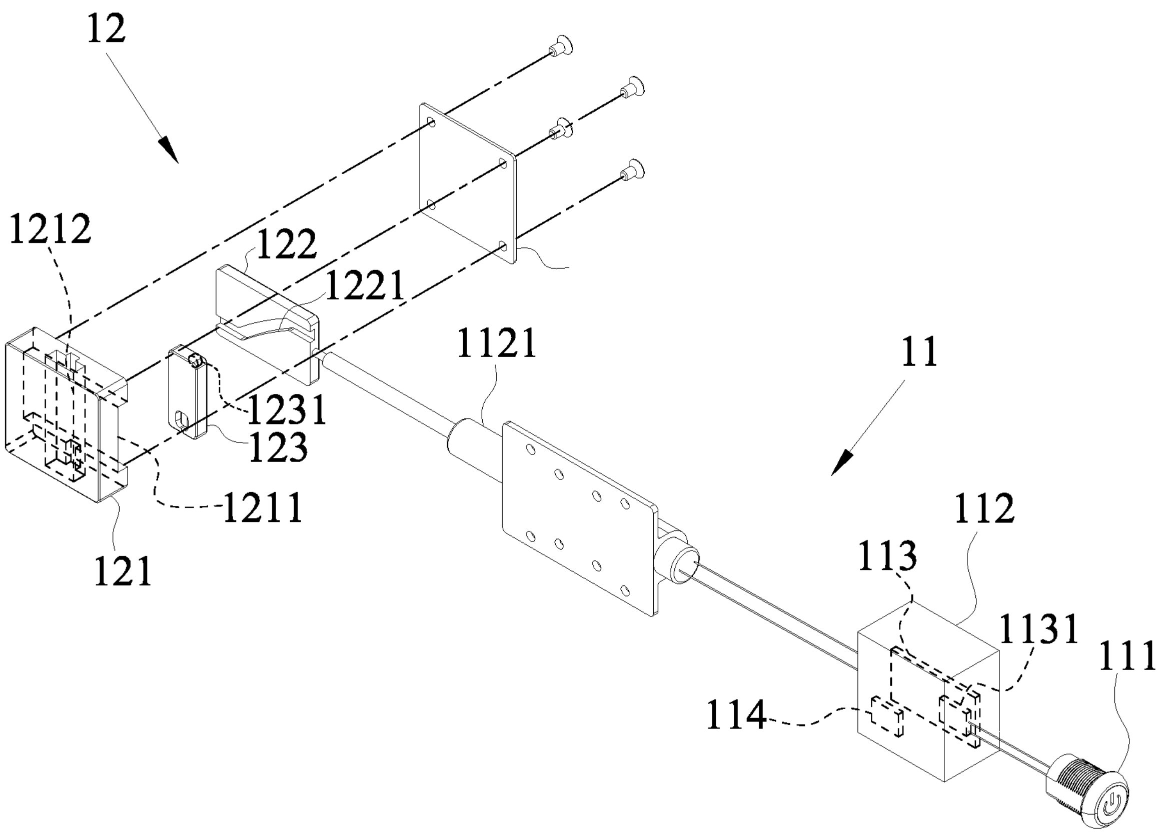
FIG. 1 is an exploded view of a preferred embodiment of this disclosure.
Figure 2:
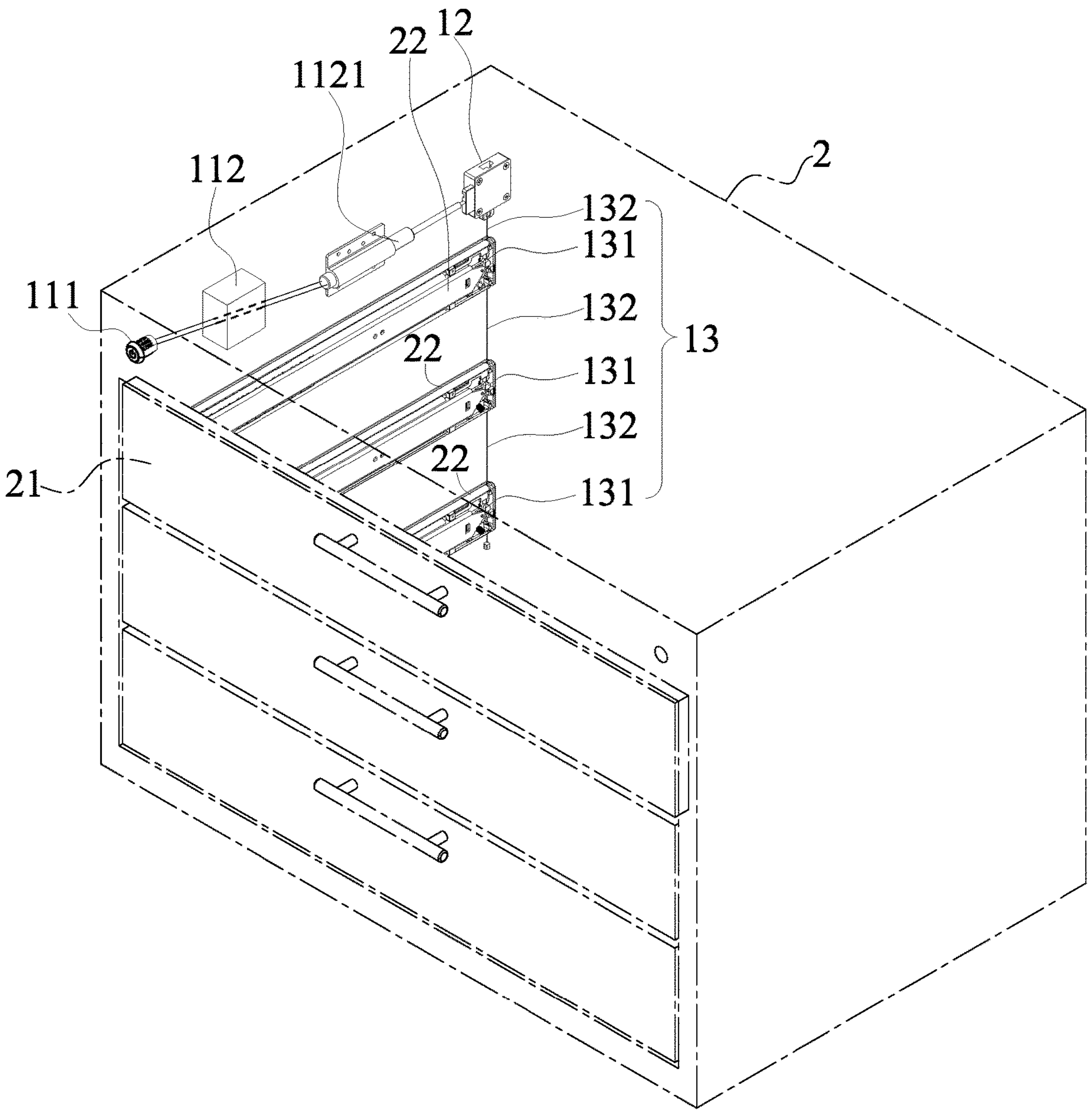
FIG. 2 is a perspective view of a preferred embodiment of this disclosure after assembly.
Figure 3:
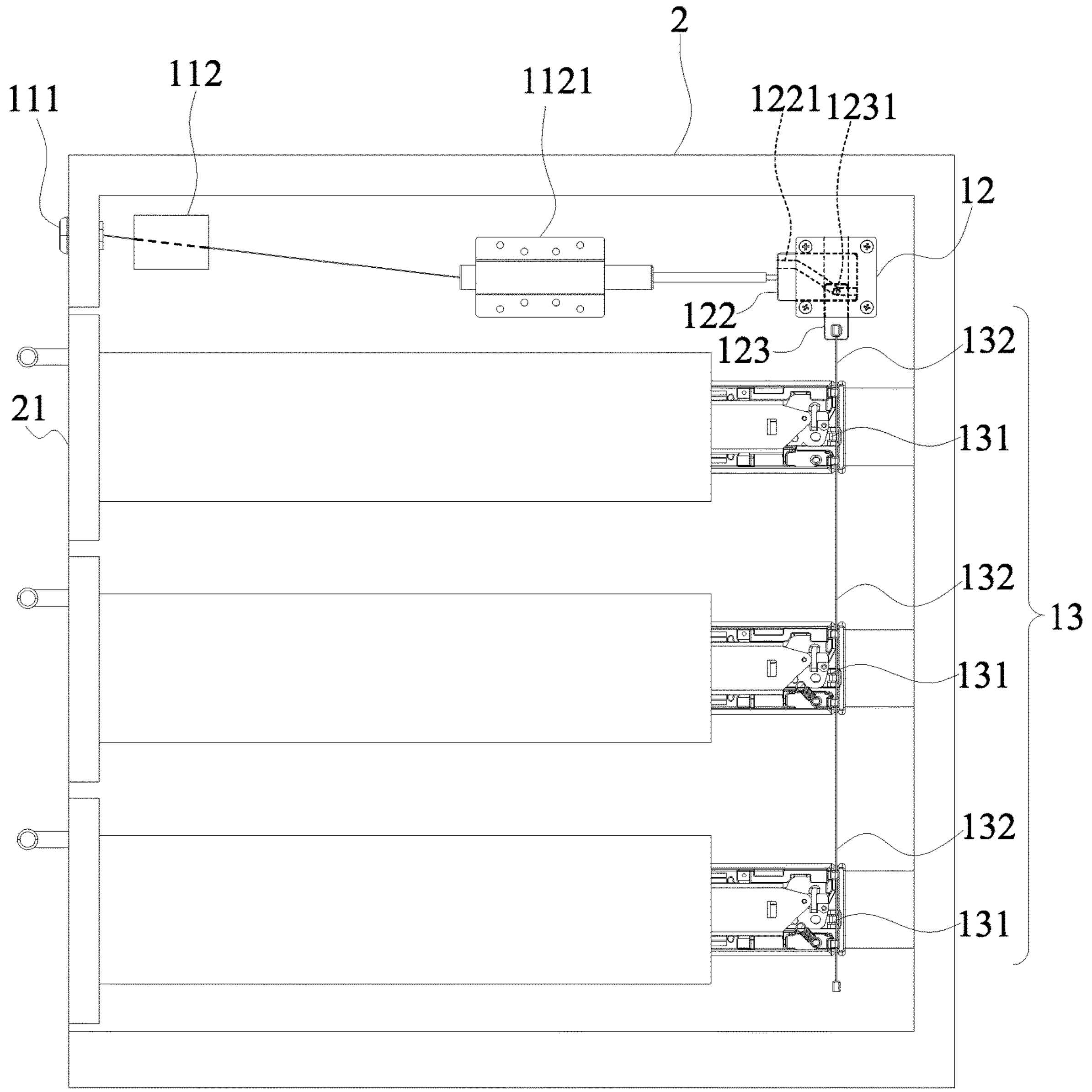
FIG. 3 is a first schematic view showing an operating status of a preferred embodiment of this disclosure.
Figure 4:
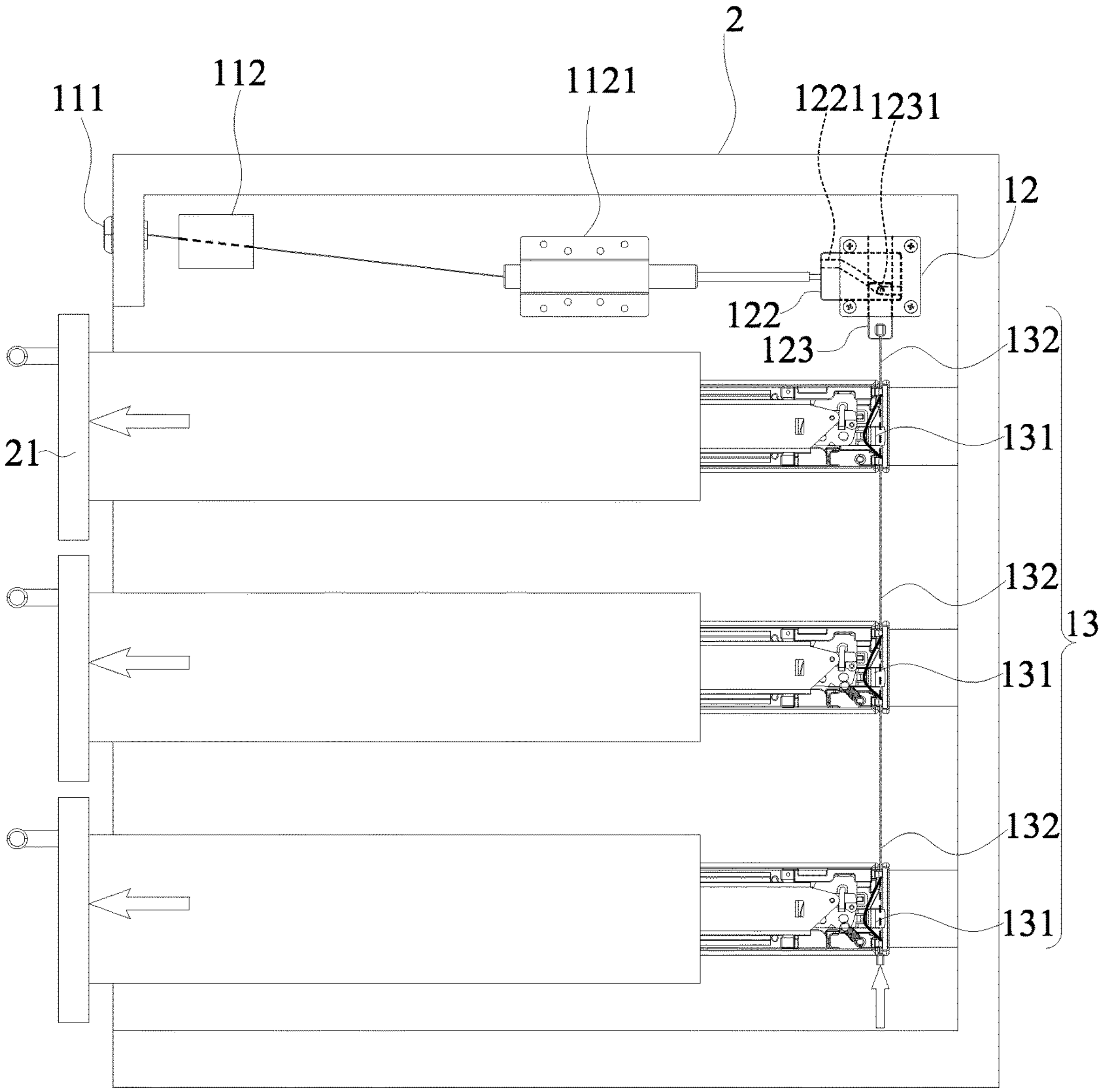
FIG. 4 is a second schematic view showing an operating status of a preferred embodiment of this disclosure.

This disclosure will now be described in more detail with reference to the accompanying drawings that show various embodiments of this disclosure.

With reference to FIGS. 1 to 6 for the exploded view of an electronically linked cabinet lock, the perspective view of the lock after assembly, the schematic views of various operating statuses of the lock in accordance with a preferred embodiment of this disclosure and the schematic view of other embodiments of this disclosure respectively, the electronically linked cabinet lock 1 of this disclosure includes an electronic device 11 and a locking module 12, which are installed onto a cabinet 2, and a plurality of slide rails 22 for connecting a plurality of drawers 21 of the cabinet 2 to provide a locking or unlocking function.

The electronic device 11 includes a sensing element 111, a main body 112, a circuit board 113 and a driver power supply 114. The sensing element 111 and the main body 112 are electrically connected to the circuit board 113, the circuit board 113 is electrically connected to the driver power supply 114, the circuit board 113 is installed with a recognition module 1131 for receiving and recognizing a signal of the sensing element 111, and generating a drive signal after recognition, the recognition module 1131 is one selected from a fingerprint recognition, RFID recognition and an iris recognition module, and the main body 112 contains a movable telescopic rod 1121. By the sensor element which is installed on the surface of the cabinet 2 and provided for generating the drive signal after a correct recognition is obtained by means of fingerprint recognition, RFID recognition, iris recognition etc., the movable telescopic rod 1121 of the body 112 is driven to extend or retract.

The locking module 12 includes a fixed seat 121, a first slider 122 and a second slider 123, the fixed seat 121 is installed within a telescopic range of the movable telescopic rod 1121, the first slider 122 and the second slider 123 are movably installed in the fixed seat 121, the moving paths of the first slider 122 and the second slider 123 are configured to be perpendicular to each other, and an end of the movable telescopic rod 1121 is connected to the first slider 122. When the movable telescopic rod 1121 is extended or retracted, the first slider 122 will be driven synchronously to move back and forth, and synchronously link the second slider 123 to move reciprocally in a vertical direction. It is noteworthy that the interior of the fixed seat 121 is provided with a first slide 1211 corresponding to the first slider 122 and a second slide 1212 corresponding to the second slider 123, and the first slide 1211 and the second slide 1212 are configured to be perpendicular to each other. In addition, the interior of the first slider 122 is provided with a limit ditch 1221, and the second slider 123 has a positioning post 1231 movably installed in the limit ditch 1221, so that the second slider 123 is linked by the first slider 122 to reciprocally move in a limited manner along the extension direction of the second slide 1212.

In FIGS. 1 to 4, the electronically linked cabinet lock 1 of this disclosure further includes a cable type interlocking mechanism 13, the cable type interlocking mechanism 13 includes a plurality of locks 131 and a plurality of cables 132, each lock 131 is installed at an end of each slide rail 22 to provide a locking or unlocking function, the slide rails 22 are connected to each other by the cables 132, and one of the plurality of slide rails 22 (located at the very top) that is close to the second slider 123 is connected with the second slider 123 via the cable 132.

Figure 5:
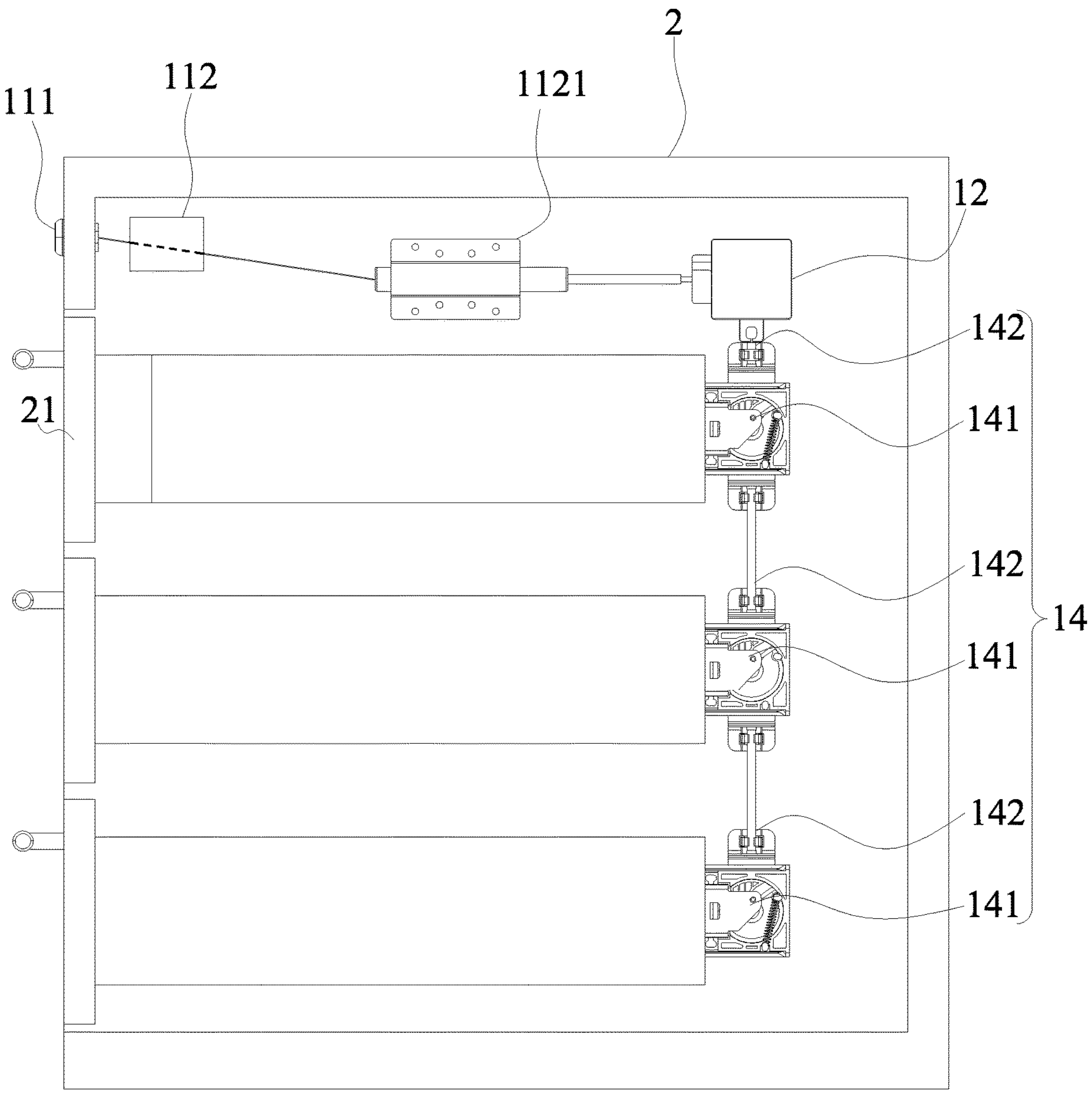
FIG. 5 is a schematic view showing the structure of another preferred embodiment of this disclosure.

In FIG. 5, the electronically linked cabinet lock 1 of this disclosure further includes a linkage rod type interlocking mechanism 14, the linkage rod type interlocking mechanism 14 includes a plurality of locks 141 and a plurality of connecting rods 142, each lock 141 is installed at an end of each slide rail 22 to provide a locking or unlocking function, the slide rails 22 are connected to each other by the connecting rods 142, and one of the plurality of slide rails 22 (located at the very top) that is close to the second slider 123 is connected with the second slider 123 via the connecting rod 142.

Figure 6:
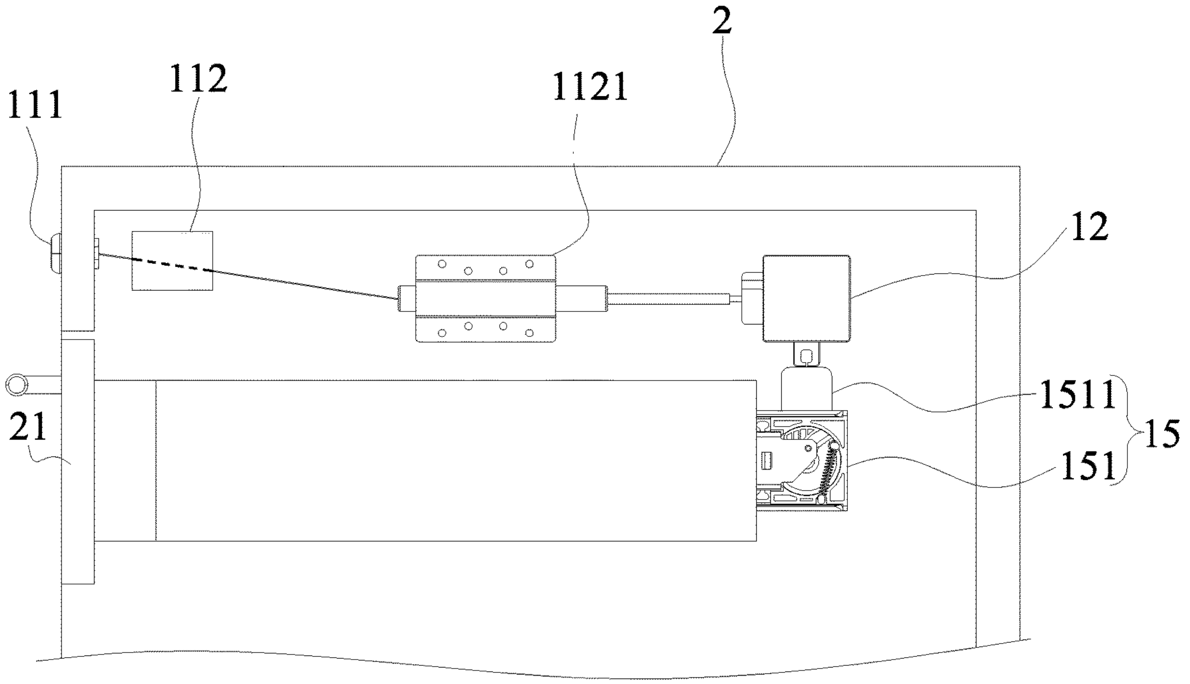
FIG. 6 is a schematic view showing the structure of a further preferred embodiment of this disclosure.

In FIG. 6, the electronically linked cabinet lock 1 of this disclosure further includes a trigger type interlocking mechanism 15, the trigger type interlocking mechanism 15 includes a plurality of locks 151 installed at the end of each slide rail 22 to provide a locking or unlocking function, and each lock 151 has a trigger part 1511 connected to the second slider 123.

In summation of the description above, after the locking module 12 and the slide rails 22 of the electronically linked cabinet lock 1 of this disclosure are connected by various interlocking mechanisms, users can trigger the lock by the sensing element 111, and the recognition module 1131 will perform a recognition for confirmation before generating a drive signal to drive the movable telescopic rod 1121 to extend or retract, so as to drive the second slider 123 to link the interlocking mechanisms for an unlocking or locking operation, and achieve the effects of locking and unlocking one or more slide rails at the same time, and completing the locking/unlocking operation of all drawers at a time. Therefore, the locking module 12 of this disclosure can be applied to all kinds of interlocking devices or interlocking modules available on the market, and an electronic sensing effect is added to enhance its practicality.

What is claimed is:

1. A cabinet comprising:

an electronically linked cabinet lock installed on the cabinet and coupled to a plurality of slide rails for use of all drawers of the cabinet, to provide a complete locking or unlocking function, the electronically linked cabinet lock comprising:

an electronic device comprising a sensing element installed on a surface of the cabinet, a main body located in an interior of the cabinet and electronically coupled to the sensing element, and a movable telescopic rod installed in the main body;

a locking module, installed within a telescopic range of the movable telescopic rod, and comprising a fixed seat, a first slider, and a second slider, the first slider and the second slider being movably installed in the fixed seat, a moving path of the first slider and a moving path of the second slider being configured to be perpendicular to each other, an end of the movable telescopic rod being coupled to the first slider; and a cable interlocking mechanism, wherein the plurality of slide rails is simultaneously locked or unlocked when the first slider is pushed along its moving path by extension or retraction of the movable telescopic rod, thereby causing the second slider, which is linked to the first slider, to move along its moving path in a vertical direction, wherein the movable telescopic rod is extended or retracted in response to a drive signal generated by a triggering of the sensing element, and the cable interlocking mechanism comprises a plurality of locks and a plurality of cables, each of the plurality of locks being installed at an end of each of the plurality of slide rails and providing the locking or unlocking of the slide rails, the plurality of locks being coupled to each other by the plurality of cables, and one of the plurality of locks that is close to the second slider is connected with the second slider via one of the plurality of cables.

2. The cabinet according to claim 1, wherein the electronic device further comprises a circuit board and a driver power supply, the sensing element and the main body are coupled to the circuit board, the circuit board is electrically coupled to the driver power supply, the circuit board comprises a recognition module installed thereon for receiving and recognizing the signal of the sensing element, and then generating the drive signal after the recognition.

3. The cabinet according to claim 2, wherein the recognition module uses a recognition technology selected from a group consisting of fingerprint recognition, RFID recognition, and iris recognition.

4. The cabinet according to claim 1, wherein the fixed seat comprises a first slide disposed therein and configured to be corresponsive to the first slider and a second slide configured to be corresponsive to the second slider, and the first slide and the second slide are configured to be perpendicular to each other.

5. The cabinet according to claim 4, wherein the first slider comprises a limit ditch formed therein, and the second slider comprises a positioning post movably installed in the limit ditch, so that the second slider is linked by the first slider to move in a limited manner along its moving path.

* * * * *